United States Patent [19]

Sasson

[11] Patent Number: 5,189,526
[45] Date of Patent: Feb. 23, 1993

[54] METHOD AND APPARATUS FOR PERFORMING IMAGE COMPRESSION USING DISCRETE COSINE TRANSFORM

[75] Inventor: Steven J. Sasson, Hilton, N.Y.
[73] Assignee: Eastman Kodak Company, Rochester, N.Y.
[21] Appl. No.: 591,319
[22] Filed: Sep. 21, 1990
[51] Int. Cl.[5] .................... H04N 1/415; H04N 7/12
[52] U.S. Cl. .................... 358/432; 358/426; 358/133; 358/138
[58] Field of Search ............ 358/432, 426, 433, 261.4, 358/133, 138, 47, 445, 75; 382/56

[56] References Cited
U.S. PATENT DOCUMENTS

| | | | |
|---|---|---|---|
| 4,330,833 | 5/1982 | Pratt et al. | 382/42 |
| 4,417,269 | 11/1983 | Dischert | 358/12 |
| 4,446,484 | 5/1984 | Powell | 358/166 |
| 4,549,212 | 10/1985 | Bayer | 358/167 |
| 4,553,165 | 11/1985 | Bayer | 358/167 |
| 4,608,600 | 8/1986 | Sugiyama | 358/138 |
| 4,677,479 | 6/1987 | Hatori et al. | 358/135 |
| 4,692,806 | 9/1987 | Anderson et al. | 358/209 |
| 4,876,590 | 10/1989 | Parulski | 358/41 |
| 5,051,840 | 9/1991 | Watanabe et al. | 358/432 |

OTHER PUBLICATIONS

"Optical Scanning of Continuous-Tone and Line Documents with Spatial Frequency Separation for Improved Data Handling and Compaction" by H. R. Schindler, S. S. Soo and J. M. White, *IBM Technical Disclosure Bulletin*, vol. 20, No. 12, May 1978, pp. 5416–5421.

Primary Examiner—Stephen Brinich
Assistant Examiner—Thomas D. Lee
Attorney, Agent, or Firm—Parkhurst, Wendel & Rossi

[57] ABSTRACT

A method and apparatus for performing data compression is disclosed that does not require interpolation of pixel data in order to define image blocks. More specifically, the present invention provides spatially interleaved image blocks composed of high frequency image components by sampling the high frequency image components at a pitch or spatial sample frequency equal to that of the low frequency image components. The present invention provides the added advantage of reducing the number of image blocks that must be defined in order to perform data compression.

5 Claims, 6 Drawing Sheets

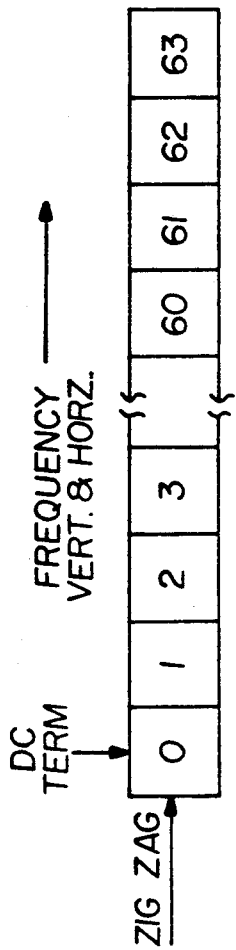
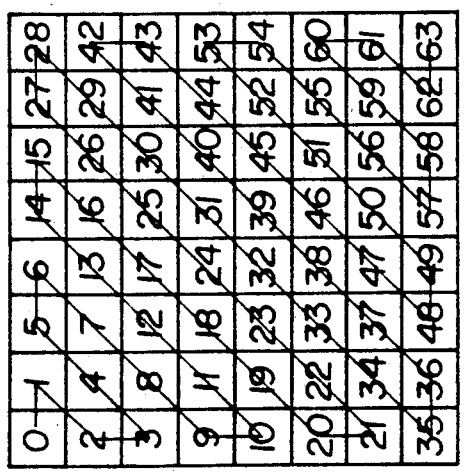
FIG. 4
FIG. 5

FIG. 6A — BLOCK 1

FIG. 6B — BLOCK 2 (SHIFT RIGHT ONE PIXEL)

FIG. 6C — BLOCK 3 (SHIFT DOWN ONE PIXEL)

FIG. 6D — BLOCK 4 (SHIFT DOWN ONE, RIGHT ONE)

METHOD AND APPARATUS FOR PERFORMING IMAGE COMPRESSION USING DISCRETE COSINE TRANSFORM

BACKGROUND OF THE INVENTION

The present invention is related to a method and apparatus for performing image compression. In particular, the invention eliminates the need for interpolation routines to define image blocks when performing image compression of a source image composed of highly sampled image components and less frequently sampled image components. The invention also reduces the number of image blocks required to perform image compression.

A common method of producing color image information in solid-state imaging systems is to provide a color filter array (CFA) over an image pixel plane of a solid-state imager. Generally, the CFA is configured to produce highly sampled image components (high frequency components) for luminance information and less frequently sampled image components (low frequency components) for color information. For example, the CFA may have a repeated pattern of several rows of green pixels followed by a single row of alternating red and blue pixels. In such a case, the higher frequency green pixels are used to provide luminance information while the lower frequency red/blue pixels are used to provide for color information. An example of such a CFA is illustrated in U.S. Pat. No. 4,876,590 issued to Parulski on Oct. 24, 1989.

The patterning of the CFA can cause difficulties when applying data compression techniques that utilizea discrete cosine transform to compress the image information generated in the above-described solid-state imaging systems. In order to perform data compression, the image information must be divided into a number of image blocks in which spatial samples in the image blocks are equally spaced, i.e., the total image information must be divided into a plurality of image blocks of equally spaced green pixels. The definition of the image blocks is typically accomplished by grouping adjacent green pixels. Interpolation routines must be performed, however, to replace the rows of lower frequency red/blue pixels with interpolated rows of green pixels prior to defining the image blocks and performing data compression, in order to maintain proper spacing between the green pixels.

The requirement for performing the interpolation routines adds complexity and expense to a data compression system. In addition, the speed at which data compression can be performed is reduced by the requirement for interpolating pixel data. Accordingly, it would be desirable to provide a method and apparatus for performing image compression that does not require the higher frequency image components to be interpolated prior to performing a data compression operation.

SUMMARY OF THE INVENTION

The present invention provides a method and apparatus for performing data compression without requiring interpolation of pixel data in order to define image blocks. Instead of interpolation, the present invention provides spatially interleaved image blocks composed of highly sampled image components bysampling the highly sampled image components at a pitch or spatial sample frequency equal to that of the less frequently sampled image components. The present invention provides the added advantage of reducing the number of image blocks that must be defined in order to perform data compression.

BRIEF DESCRIPTION OF THE DRAWINGS

With the above as background, reference should now be made to the detailed description of the preferred embodiment of the invention and the accompanying drawings for a further explanation of the invention, wherein:

FIG. 4 illustrates the arrangement of transformed block components are then arranged into a serial 64 bit element array;

FIG. 5 illustrates a section of a color filter array;

FIGS. 6A-6D illustrate the definition of spatially interleaved image blocks in accordance with the present invention;

DETAILED DESCRIPTION OF PREFERRED EMBODIMENT

Figure 1:
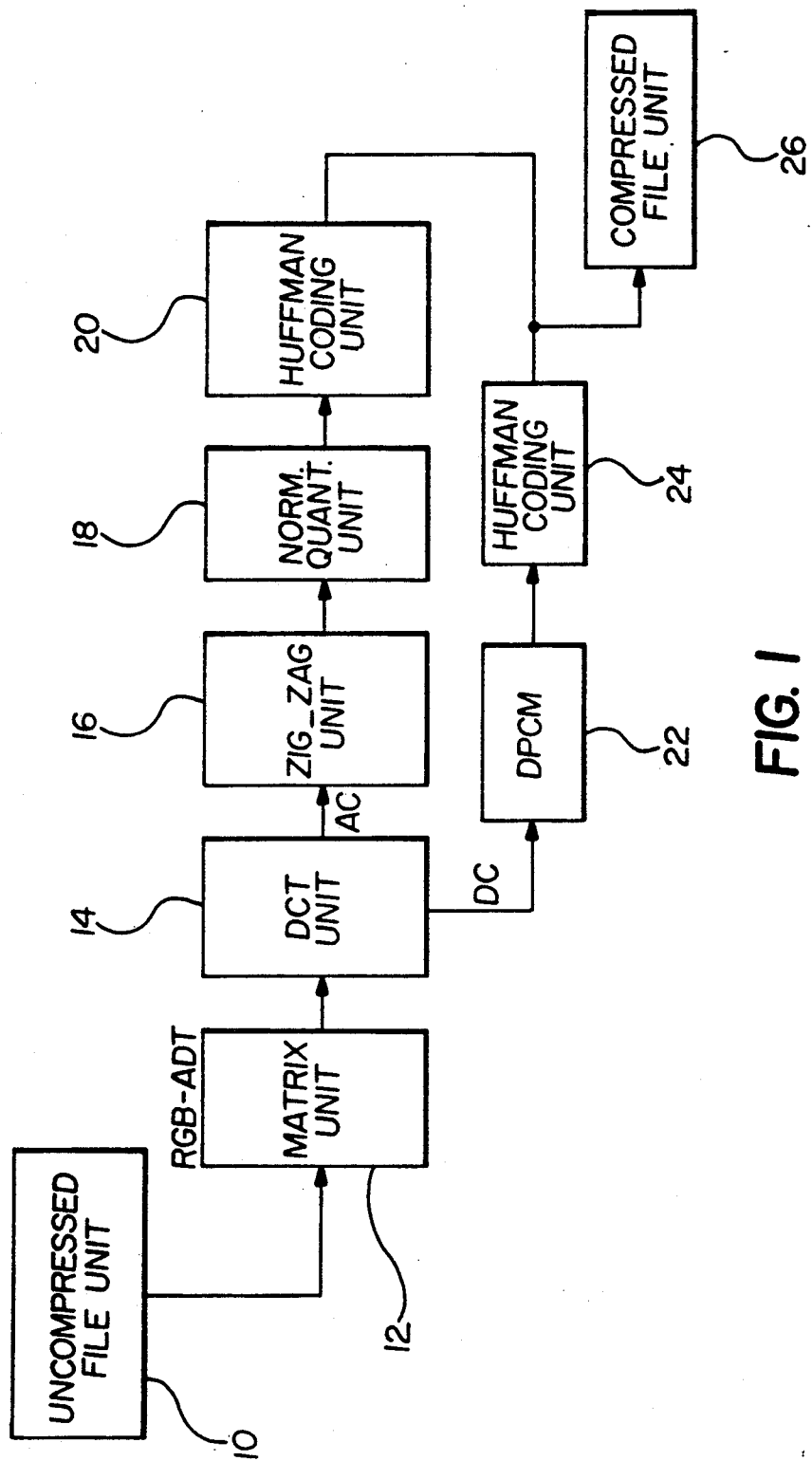
FIG. 1 represents a block diagram illustrating a prior art data compression system employing a discrete cosine transform.
Figure 2:
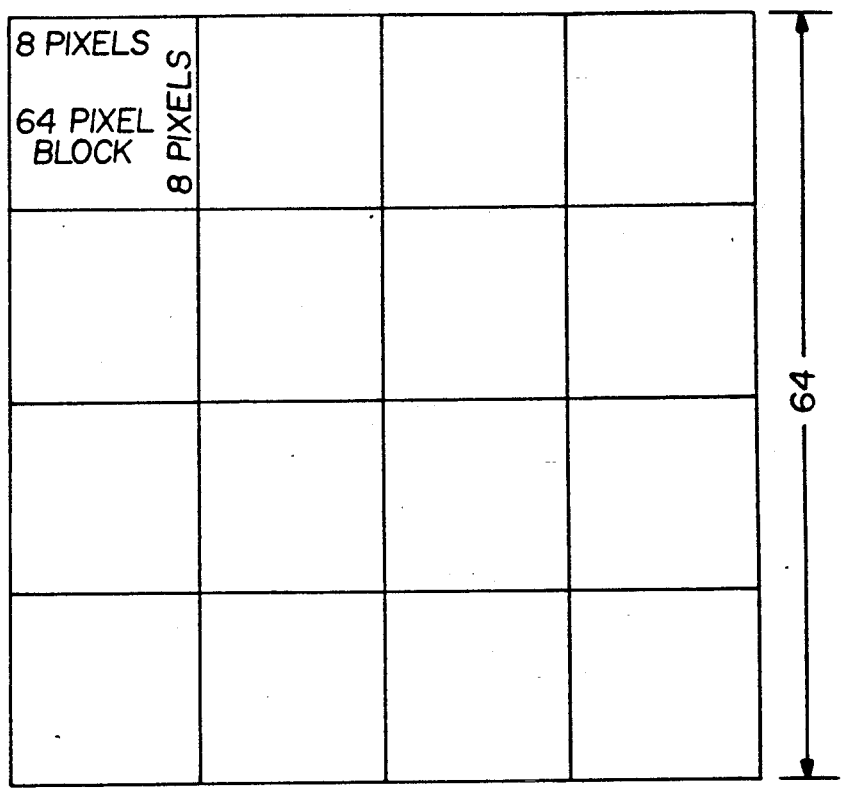
FIG. 2 illustrates a planar image divided into a plurality of image blocks.
Figure 3:
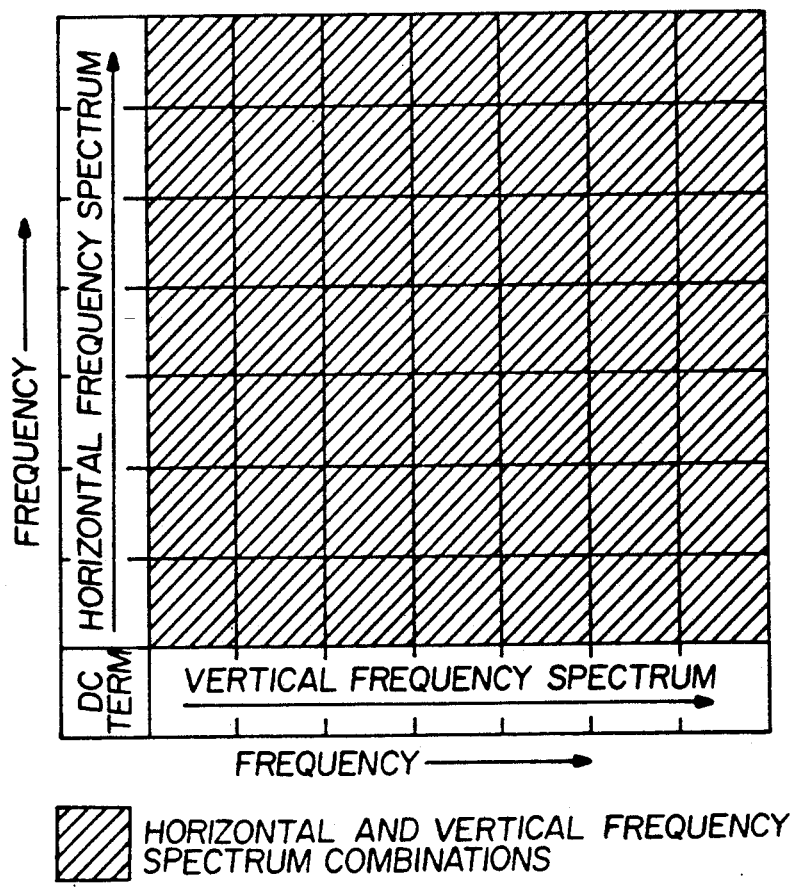
FIG. 3 illustrates two-dimensional discrete cosine transformed image blocks.

In order to more fully describe the problem addressed and solved by the present invention, a conventional image compression process utilizing a discrete cosine transform will be discussed with reference to FIGS. 1-5. As shown in FIG. 1, uncompressed RGB planer input image data is supplied from an uncompressed file unit 10 to a RGB-ADT matrix unit 12. The input image data is preferably generated by a solid-state image device including a CFA (not shown), although the input image data can also be generated using other conventional imaging systems. The input image data is divided into a number of image blocks. For example, a 512×512 planar image is divided into a plurality image blocks dimensioned eight pixels by eight pixels as shown in FIG. 2, with each pixel representing an eight bit word. It will be understood that planar images and image blocks of various sizes may be readily employed, along with higher resolution pixel words if desired. The image blocks are supplied to a discrete cosine transform unit 14 (FIG. 1), which generates two dimensional discrete cosine transformed 8×8 image blocks as illustrated in FIG. 3. The transformed image block components are then arranged into a serial 64 bit element array by a zig zag unit 16 in a manner illustrated in FIG. 4. Normalization and coding is then provided by a normalization unit 18 and a Huffman coding unit 20. A differential pulse code modulation unit 22 compares the DC term of a particular block with the DC term of a previous block and the difference is coded by a second Huffman coding unit 24. The output of both Huffman coding units 20 and 24 is the compressed image data which is stored in the compressed file unit 26.

A section of a CFA for use with a solid-state imager to generate the uncompressed image data is illustrated in FIG. 5. The illustrated CFA utilizes a 3-1-3 filter pattern, i.e., three rows of green pixels (high frequency component), one row of alternating red and blue pixels (low frequency component), three rows of green pixels, etc., which would normally require interpolation of pixel data if image blocks were to be defined using adjacent pixels. For example, rows four and eight of an 8×8 block (defined by the dotted line) contain red/blue pixel data and would have to be replaced with interpolated green pixel data before compression of the block could be performed, as all of the elements of a block must represent the same kind of data (green) and be equally spaced within the image block in order for image compression to be effectively accomplished.

The present invention is based on the recognition that image blocks need not be composed of adjacent pixels to maintain equal spacing between spatial samples. Instead, an image block can be composed of only real spatial data samples, as opposed to the use of interpolated values, if the image block is made up of pixels subsampled at a pitch or spatial sampling frequency equal to that of the low frequency component, i.e., the rows that must normally be interpolated using conventional image data compression techniques. For example, for the CFA illustrated in FIG. 5, an image block can be made up from every fourth vertically spaced pixel, i.e., row 1, 5, 9, etc., and every fourth horizontally spaced pixel, i.e., column 1, 5, 9, etc., with subsequent image blocks being composed by shifting the sampling pattern one pixel or row at a time. The above-described sampling results in a plurality of image blocks that are spatially interleaved.

The above-described "spatial interleaving" is illustrated in greater detail in FIGS. 6A-6D. The image block in FIG. 6A is defined by starting at pixel 1—1 (row 1, column 1) and selecting every fourth vertical pixel and every fourth horizontal pixel of the entire planar image as illustrated. It should be noted that none of the pixels selected for the image block are from rows four or eight, which contain the low frequency red/blue pixels, and each of the selected pixels is equally spaced. A second image block is defined in a similar manner starting with pixel 1-2 as illustrated in FIG. 6B, thereby effectively shifting the second image block one pixel to the right of the first block. Additional image blocks are defined in a similar manner (FIGS. 6C, 6D) until all of the green pixels are assigned to a specific image block.

The spatial interleaving method provides the advantage of defining the image blocks without requiring interpolation of pixel data for rows containing low frequency color pixel data, thereby resulting in a decrease in the amount of time required to perform image compression. An additional advantage is provided, however, as the number of image blocks formed by spatial interleaving is less than the number of image blocks required if spatial sampling of adjacent pixels is used with interpolation. For example, in the illustrated example, only 48 vertical blocks of green pixels will be formed as compared with the 64 vertical required using the interpolation method. Thus, the time required to perform image compression is substantially reduced.

Figure 7:
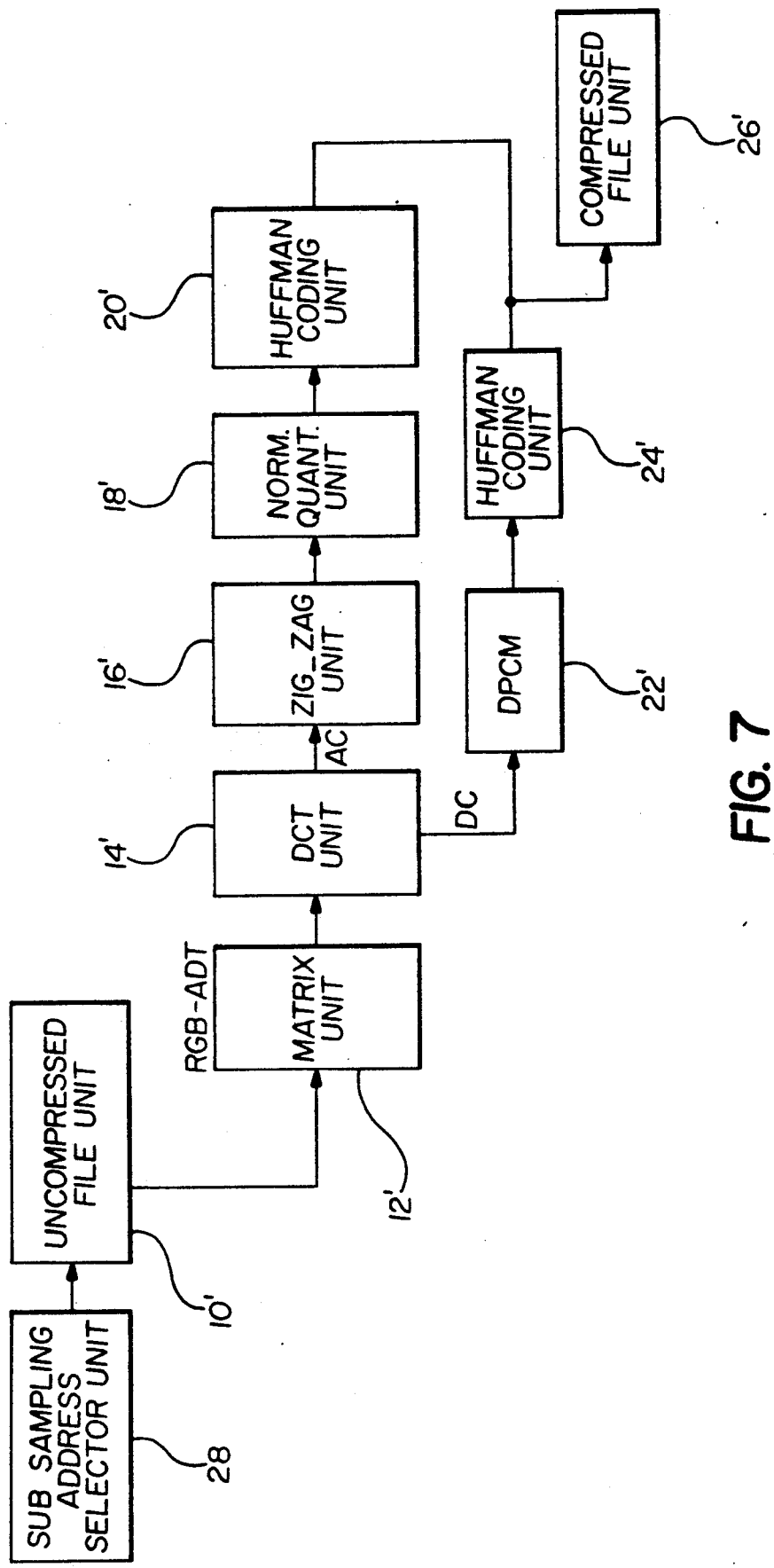
FIG. 7 illustrates a schematic block diagram of an image compression system in accordance with the present invention.

FIG. 7 is a schematic block diagram of an image compression system utilizing the above-described sampling method. The basic data compression elements are identical to the elements illustrated in FIG. 1 and are denoted by a prime "'" notation. A sub-sampling address selector unit 28 is coupled to the uncompressed file unit 10'. The sub-sampling address selector unit 28 provides addressing information to the uncompressed file unit 10' so that data is read out from the uncompressed file unit 10' in the manner illustrated in FIGS. 6A-6D to form the image blocks that are supplied to the matrix 12'. The convention discrete cosine transform technique described with respect to FIG. 1 is then employed to generate compressed image data which is stored in the compressed file 26'.

Figure 8:
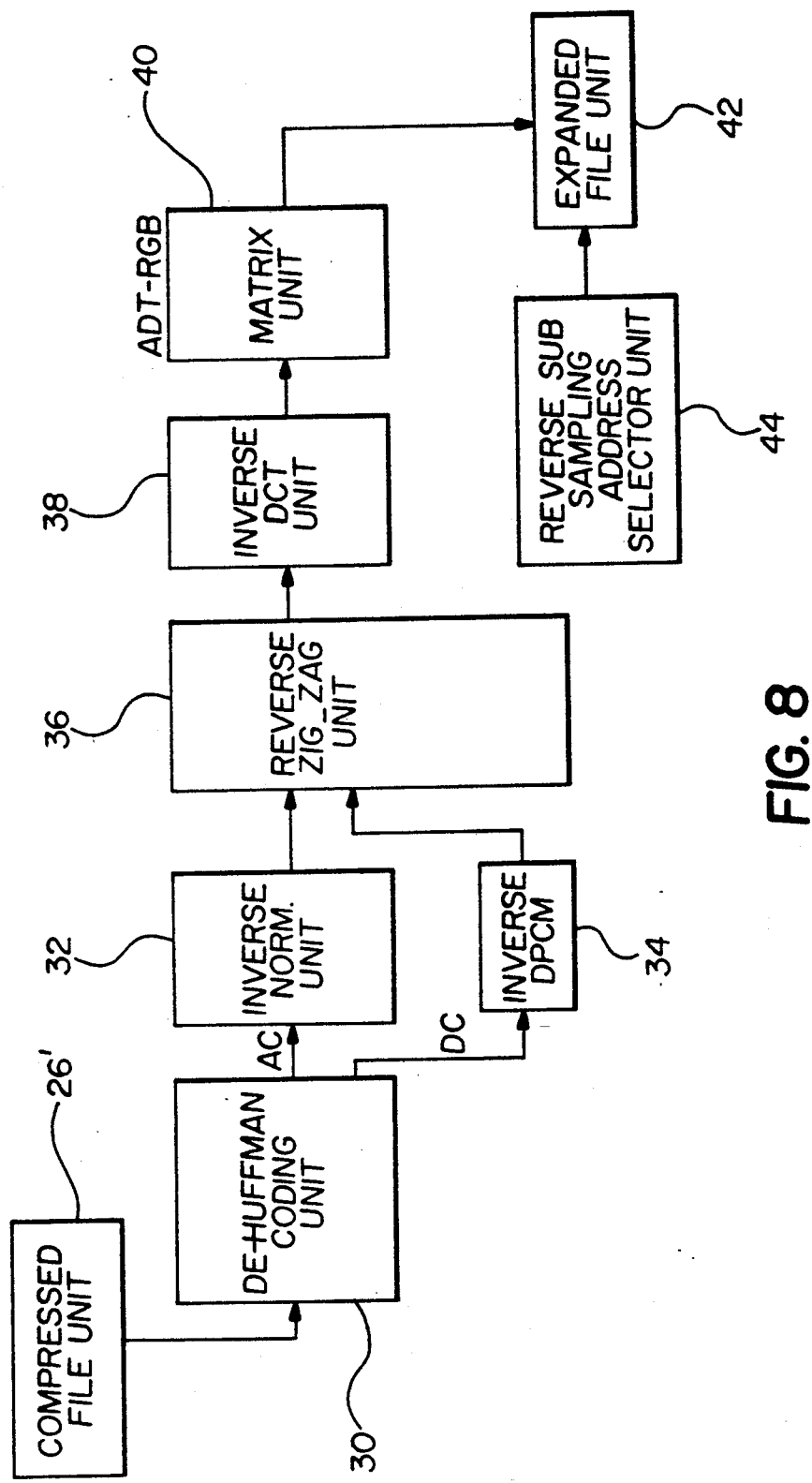
FIG. 8 illustrates a schematic block diagram of an image decompression system in accordance with the present invention.

Decompression of the compressed image data is accomplished by basically reversing the compression process. FIG. 8 is a schematic block diagram of a decompression system. Data from the compressed file 26' is supplied to a De-Huffman coding unit 30 in which the compressed data is Huffman decoded. The AC terms are denormalized by an inverse normalization unit 32 and the DC terms are supplied to an inverse DPCM unit 34. The output of the inverse normalization unit 32 and the inverse DPCM unit 34 are supplied to a reverse zig zag unit 36 that puts the reconstructed elements back into a two dimensional array. An inverse discrete cosine transform is then performed on the array by an inverse DCT unit 38. The output from the inverse DCT unit 38 is supplied to a matrix unit 40 to convert from ADT to RGB. The output of the matrix unit 40 is then supplied to an expanded file unit 42. A reverse sub-sampling address selector unit 44 is coupled to the expanded file unit 42 and provides addressing data to the expanded file unit 42 so that the expanded data stored in the proper configuration.

The invention has been described with referenced to certain preferred embodiments thereof. It will be understood, however, that modifications and variations are possible within the scope of the appended claims. For example, the high frequency sampling scheme can be varied as long as proper spacing is maintained between the high frequency components and the low frequency components are not selected.

What is claimed is:

1. A method of performing image compression of image data comprising the steps of:
   generating uncompressed image data including high image frequency components and low frequency image components; sampling said uncompressed image data and forming a plurality of image blocks including only said high frequency image components of said uncompressed image data; and performing image compression on said image blocks to generate a compressed image data;
   wherein said step of sampling said uncompressed image data and forming a plurality of image blocks comprises sampling said high frequency image components at a horizontal and vertical spatial sampling frequency equal to a spatial frequency of said low frequency components.

2. A method as set forth in claim 1, wherein said step of performing image compression includes performing a discrete cosine transform on each of said image blocks.

3. An apparatus for performing image compression comprising:
   means for storing uncompressed image data including high frequency image components and low frequency image components;
   means for defining a plurality of image blocks, wherein each of said image blocks includes only said high frequency image components of said uncompressed image data;

means for performing image compression on said plurality of image blocks and generating compressed image data;

wherein said means for defining a plurality of image blocks selects high frequency image components using a spatial sampling frequency that is based on a spatial frequency of said low frequency image components.

4. An apparatus as claimed in claim 3, wherein said means for performing image compression includes means for performing a discrete cosine transform on each of said image blocks.

5. An apparatus for processing image data, said apparatus comprising:

an uncompressed file unit for storing uncompressed image data including high frequency components and low frequency components;

a sub-sampling address unit coupled to said uncompressed file unit, said sub-sampling address unit supplying addressing data to said uncompressed file unit, wherein said uncompressed image data is read out from said uncompressed file unit as a plurality of image blocks consisting essentially of said high frequency image components;

image compression means coupled to said uncompressed file unit for performing image compression on said image blocks to form compressed image data;

wherein said address data supplied by said sub-sampling address unit samples selects high frequency image components based on a spatial frequency of said low frequency image components.

* * * * *